(12) United States Patent
Giraud et al.

(10) Patent No.: US 12,363,439 B2
(45) Date of Patent: Jul. 15, 2025

(54) MULTI-ORBIT SPACE MONITORING DEVICE

(71) Applicant: ARIANEGROUP SAS, Les Mureaux (FR)

(72) Inventors: Paul Giraud, Le Haillan (FR); Yoann Dussoulier, Le Haillan (FR); Guillaume Delomenie, Le Haillan (FR); Gaëtan Eyheramono, Le Haillan (FR)

(73) Assignee: ARIANEGROUP SAS, Les Mureaux (FR)

( * ) Notice: Subject to any disclaimer, the term of this patent is extended or adjusted under 35 U.S.C. 154(b) by 0 days.

(21) Appl. No.: 18/871,056

(22) PCT Filed: May 26, 2023

(86) PCT No.: PCT/FR2023/050739
§ 371 (c)(1),
(2) Date: Dec. 2, 2024

(87) PCT Pub. No.: WO2023/233091
PCT Pub. Date: Dec. 7, 2023

(65) Prior Publication Data
US 2025/0175703 A1      May 29, 2025

(30) Foreign Application Priority Data
Jun. 3, 2022   (FR) ...................................... 2205362

(51) Int. Cl.
*H04N 23/695*    (2023.01)
*B64G 3/00*      (2006.01)
(Continued)

(52) U.S. Cl.
CPC ............. *H04N 23/695* (2023.01); *B64G 3/00* (2013.01); *H04N 23/51* (2023.01); *H04N 23/54* (2023.01); *H04N 23/55* (2023.01); *H04N 23/90* (2023.01)

(58) Field of Classification Search
CPC ...... H04N 23/695; H04N 23/51; H04N 23/54; H04N 23/90; H04N 23/55; B64G 3/00
(Continued)

(56) References Cited

U.S. PATENT DOCUMENTS

| | | | |
|---|---|---|---|
| 6,356,308 B1 * | 3/2002 | Hovanky | G08B 13/1963 348/211.1 |
| 7,012,637 B1 * | 3/2006 | Blume | H04N 23/90 348/E7.086 |

(Continued)

FOREIGN PATENT DOCUMENTS

| | | |
|---|---|---|
| EP | 1772761 A1 | 4/2007 |
| EP | 2593366 A1 | 5/2013 |

(Continued)

OTHER PUBLICATIONS

Search Report and Written Opinion issued in International Application No. PCT/FR2023/050739, mailed Sep. 4, 2023.

*Primary Examiner* — Matthew David Kim
(74) *Attorney, Agent, or Firm* — Bookoff McAndrews, PLLC

(57) ABSTRACT

A device for monitoring objects in space orbit around the Earth, the device including a chassis, a plate, at least three optical survey modules, and a power supply and control block housed at least partially inside the chassis, the plate being mounted on the chassis, and each optical survey module being mounted on the plate and including a rotating turret, an image sensor mounted on the rotating turret, and a passive optical system mounted on the inlet of the image sensor, the rotating turret being configured to pivot over (Continued)

more than 360° about a first axis perpendicular to the plane in which the plate extends and to pivot over 90° about a second axis perpendicular to the first axis and parallel to the plane in which the plate extends.

10 Claims, 3 Drawing Sheets

(51) Int. Cl.
  *H04N 23/51* (2023.01)
  *H04N 23/54* (2023.01)
  *H04N 23/55* (2023.01)
  *H04N 23/90* (2023.01)
(58) Field of Classification Search
  USPC .......................................................... 348/159
  See application file for complete search history.

(56) References Cited

U.S. PATENT DOCUMENTS

| | | |
|---|---|---|
| 7,045,774 B2 | 5/2006 | Wheeler et al. |
| 7,319,556 B1 | 1/2008 | Ackermann et al. |
| 10,979,652 B1* | 4/2021 | Jun .................. H04N 23/55 |
| 2005/0264796 A1* | 12/2005 | Shaw .................. G01N 21/954 |
| | | 356/237.2 |
| 2007/0188610 A1 | 8/2007 | Micotto et al. |
| 2009/0009897 A1 | 1/2009 | Holota et al. |
| 2009/0015914 A1 | 1/2009 | Duncan et al. |
| 2009/0147238 A1 | 6/2009 | Markov et al. |
| 2010/0278521 A1* | 11/2010 | Sandler .................. G01S 17/89 |
| | | 396/155 |
| 2012/0105822 A1 | 5/2012 | Sandler et al. |
| 2016/0352982 A1* | 12/2016 | Weaver .................. H04N 23/695 |
| 2017/0299949 A1* | 10/2017 | Donaldson ............ G03B 17/08 |
| 2021/0058556 A1* | 2/2021 | Kim ...................... H04N 23/90 |
| 2021/0227105 A1* | 7/2021 | Davenel ................ H04N 23/51 |
| 2022/0100978 A1* | 3/2022 | West ........................ G06K 7/14 |
| 2022/0392105 A1* | 12/2022 | Bramlett .................. G06T 7/33 |
| 2023/0396892 A1* | 12/2023 | Lawler .................. H04N 23/54 |
| 2024/0267501 A1* | 8/2024 | Jeon ...................... H04N 13/243 |

FOREIGN PATENT DOCUMENTS

| | | |
|---|---|---|
| EP | 2593367 A1 | 5/2013 |
| EP | 2593368 A1 | 5/2013 |
| FR | 2742873 A1 | 6/1997 |

* cited by examiner

[Fig.1]
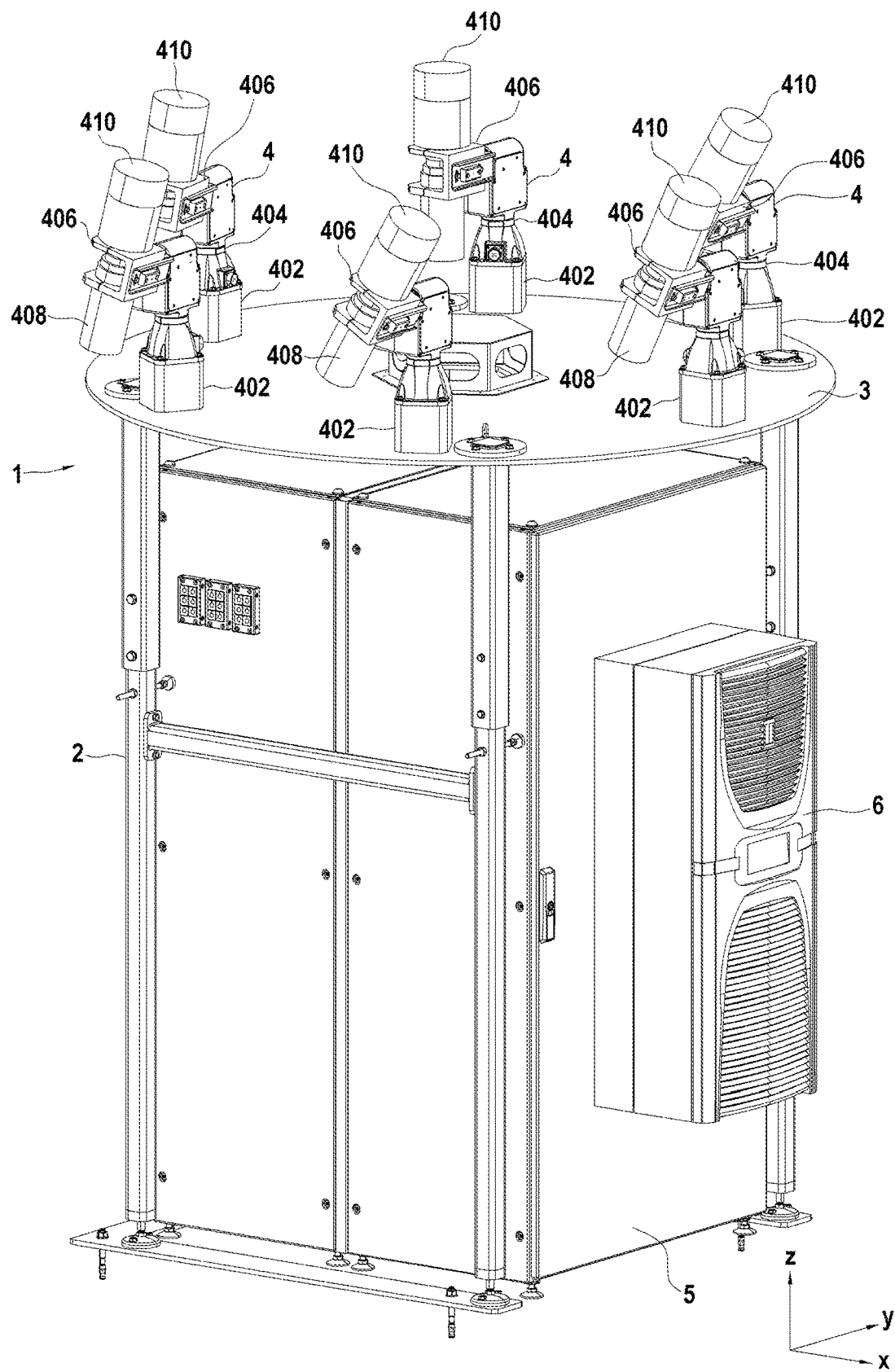

[Fig.2]
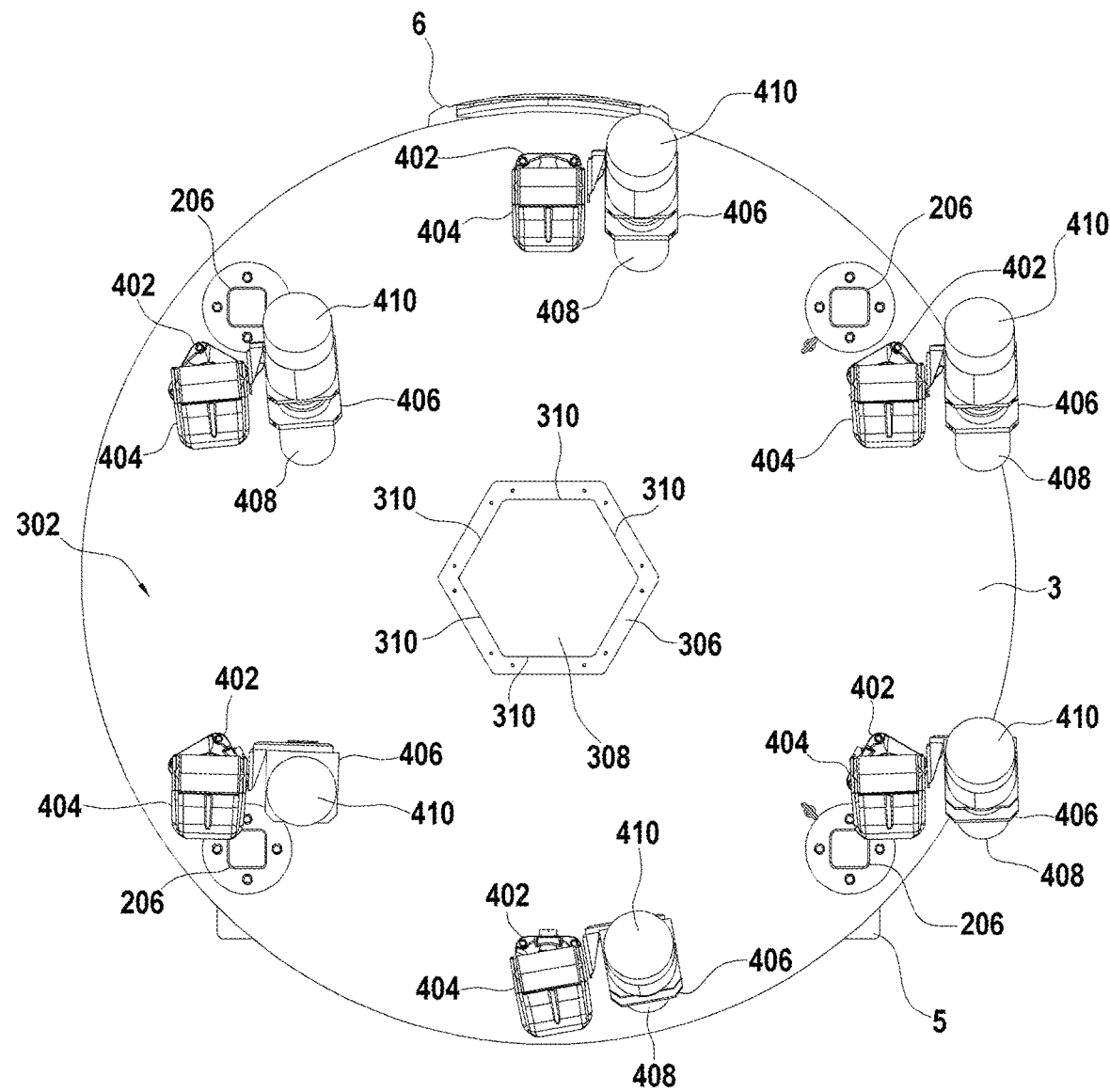

[Fig.3]
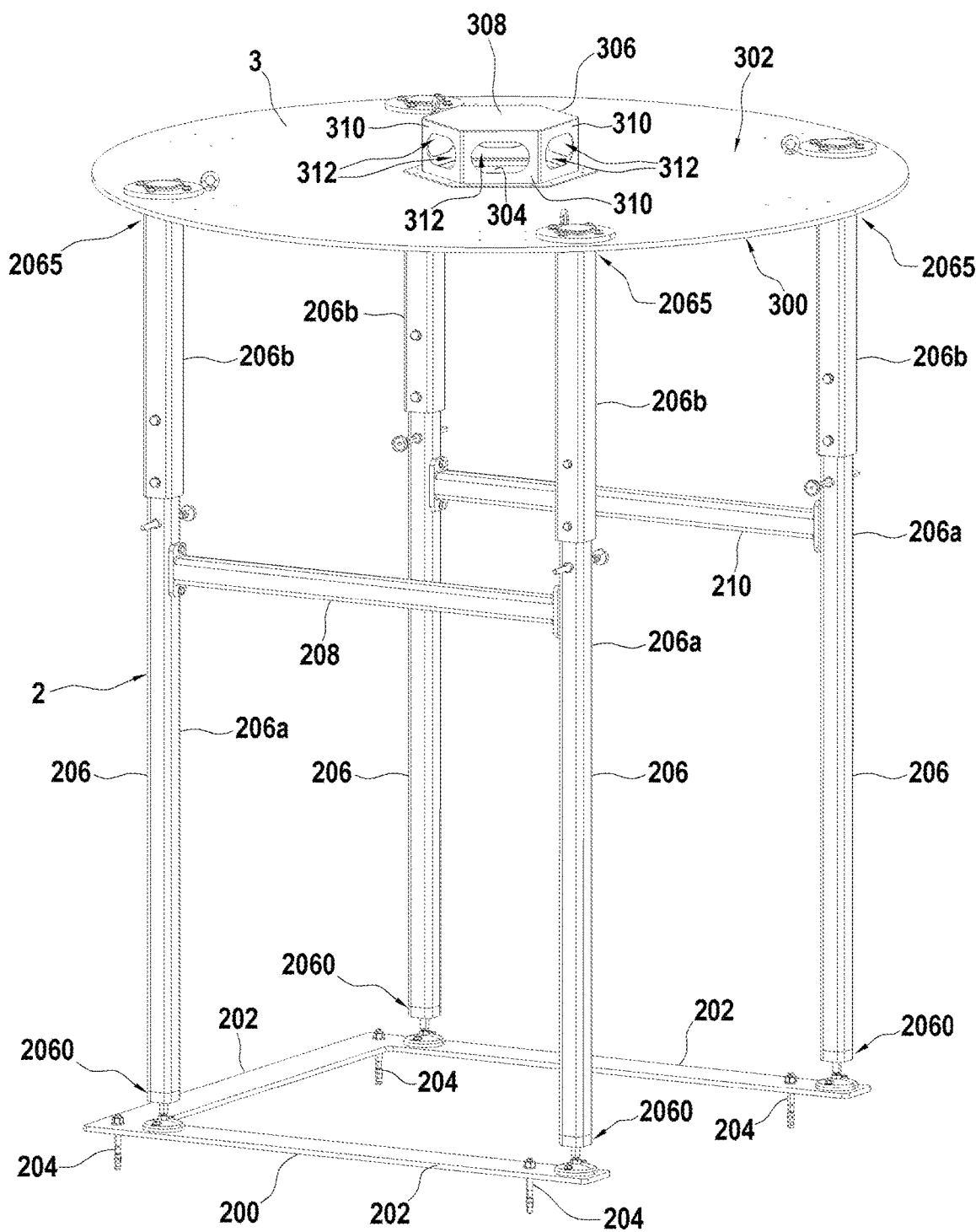

MULTI-ORBIT SPACE MONITORING DEVICE

CROSS-REFERENCE TO RELATED APPLICATIONS

This is a National Stage Application under 35 U.S.C. § 371 of International Application No. PCT/FR2023/050739, filed May 26, 2023, now published as WO 2023/233091 A1, which claims priority to French Patent Application No. 2205362, filed on Jun. 3, 2022, the entireties of which are incorporated herein by reference.

TECHNICAL FIELD

The present invention relates to a space surveillance system for the survey of near-Earth and deep-Earth space from the ground so as to detect the objects located in this space, determine their precise trajectories and monitor these trajectories.

Such a system makes it possible to follow the evolution of the trajectories of the objects and to catalogue these objects and their trajectories.

PRIOR ART

Near-Earth space is defined as the part of space located up to a few hundred thousand kilometers from the Earth. The survey of the Earth space therefore essentially, but not only, relates to the detection of the objects that are in orbit around the Earth, generally between a hundred and 36,000 km from the surface of the globe.

The context of the present invention is the increase in the number of observed objects in orbit around the Earth. These objects can be for example debris, operational satellites or even meteorites.

The invention is interested, among other things, in the objects in low Earth orbit (LEO) from 200 km to 2,000 km whose number induces an increasing risk of collisions that can lead in the long term to an increase in the degradation of the situation, but especially to risks with regard to operational space means, whether military, scientific or commercial. In order to control these risks, it is essential to catalog all the potentially hazardous objects and to associate them with valid orbital parameters that allow describing their trajectories.

Observed from a fixed point on Earth, the objects in low-Earth orbit have the characteristics of rapidly moving across the celestial vault. Furthermore, at any moment several objects cross the celestial vault in several places. Depending on its orbital parameters, the time interval between two objects successively crossing the local celestial vault can vary from a few tens of minutes to several hours.

Various effects such as tide, atmospheric braking, radiation pressure, and irregularity in the Earth's gravitational field affect the orbits. This prevents describing these orbits precisely in the long term with an invariant set of orbital parameters.

Moreover, the size distribution of the objects varies from a characteristic radius of a few millimeters, for example the propulsion, paint residues or the meteorites, to several tens of meters, in particular the satellites or artificial orbital systems, whether operational or not.

Carrying out a survey of objects in orbit around the Earth involves:
 detecting the objects in low-Earth orbit, without a priori knowledge of their existence or their position,
 defining their trajectory or orbital parameters, with an accuracy adapted to the intended use,
 updating, over time, the orbital parameters of the detected objects and the integration within a tracking catalog.

It is further necessary to reacquire the same objects and to refresh the measurement of their orbital parameters each time they pass in the field of vision of the observation means so that their accuracy remains adapted according to the use that must be made of them, for example to implement the processes of identification and consolidation of collision risks (tracking) or of mapping and surveillance of the space objects (survey).

Finally, the system must be capable of refining on demand the accuracy of the knowledge of the orbital parameters of a given object, so as to be able to determine as accurately as possible its position in the near future, typically a few days.

Carrying out these surveillance functions requires having:
 a wide field of view,
 a sensitivity allowing the detection of the objects of interest,
 a sufficient accuracy in the measurement of the evolution of the objects crossing this field of view to estimate their orbital parameters with the required level of performance.

The orbital parameters are estimated based on a time series of measurements of the position/velocity vectors of the objects acquired during their transit in the field of view.

U.S. Pat. No. 7,319,556 deals with a wide-field telescope adapted to a system performing these functions.

The main techniques currently envisaged and implemented to perform low-Earth orbit survey are based on ground-based radars:
 the Space Fence radars of the American Ministry of Defense;
 the GRAVES radars implemented by the French Ministry of Defense (phased array, or bi-static radar, with continuous emission),
 the anti-missile warning type radars (monostatic phased array radar, with pulsed emission).

Although offering many advantages (wide field of view allowing the interception of areas of 180° in azimuth over a few dozen degrees in elevation, simplified access to speed information thanks to Doppler measurements, insensitivity to weather and to the day/night cycle, etc.), the solutions using radars suffer from many disadvantages, mainly in their development, operation and maintenance costs, and in their eco-balance:
 the frequencies used are high (L band);
 there is a generation of significant magnetic losses;
 we need powers of a few tens of Megawatts, with low efficiency;
 the mean time before failure (MTBF) of the radars, like any high-power electrical equipment, is low and causes high maintenance costs;
 the orbital population accessible by each radar is conditioned by its location on the globe, which leads to positioning them in the equatorial zone, which offers severe temperature and humidity conditions for electrical and electronic components, thereby increasing the cost of operation and maintenance.

Alternatively, the optical systems have already been considered to carry out space surveillance. Purely passive, their principle lies in the detection of sunlight reflected by natural or artificial objects in orbit around the Earth or beyond, asteroids and planetoids for example. Such systems provide access to time series of measurements of the angular positions of the objects for example in azimuth and elevation.

Various methods are applied to measure these positions, such as in particular a method based on the measurement at every moment of the position of the detected objects relative to the stars present in the field of view, stars whose position is known with very high accuracy.

The major advantage of the optical systems over the radar systems lies in their low cost in development, production, operation and maintenance, in their reliability and in their simplicity of implementation.

And, purely passive, they require little infrastructure, energy, buildings, means of transport.

Optical systems are normally used to monitor the Geostationary Earth Orbit (GEO), but also to monitor the Middle Earth Orbit, located between the LEO and the GEO, because the objects on these two Earth orbits have the particularity of moving very little across the celestial vault, which facilitates the long observation times necessary for the detection of small objects and/or of very low light intensity.

The "GEODSS" system of the US Air Force is an operational example of such systems. It is mainly composed of metric telescopes with a small field of view of the order of a degree. For these GEO and MEO applications, long integration (exposure) times, from 1 to a few seconds, can be used, which allows increasing the signal-to-noise ratio in order to detect small objects with a characteristic diameter of a few tens of cm.

One example of a multi-sensor embodiment is described in document US2009/0147238.

Some studies have also been initiated to define solutions able to monitor the LEO.

For example, the French experimental system SPOC (Probationary System for the Observation of the Sky) integrated four small telescopes with an aperture of the order of 10 cm oriented according to the four cardinal points with an elevation of a few tens of degrees and each offering a field of view of the order of 10°.

Other concepts propose sensitive catadioptric systems with a metric aperture or more called wide field catadioptric systems, of the order of 5°, dedicated to the survey of the LEO, such as the system described in the aforementioned U.S. Pat. No. 7,319,556.

However, the aforementioned and currently proposed solutions do not solve the fundamental difficulties and constraints related to the survey of the LEO, namely:
- the need for a rapid detection (a few days) of any new object, in particular to identify any fragmentation or explosion phenomenon in orbit,
- the need for a frequent re-acquisition (every few days) of each object, and an update of its orbital parameters in order to maintain usable orbital parameter accuracy, in particular with regard to the operational assessment of collision risks;
- the detectability of the objects interdependent on the geographical location of the optical system and orbits (particularly inclination) of the objects, related to their lighting conditions;
- the optical observations related to local meteorological conditions (cloudiness);

Due to these constraints, the LEO survey also requires specific optical systems with very good sensitivity, excellent resolution and large field of view. Indeed, the existing telescopes usually have high sensitivity, with large apertures and/or long integration times, and high resolution, which is detrimental to a wide field of view, since they are intended for classic astronomy or surveillance applications of minor planets or asteroids: they are therefore not compatible with the surveillance of objects in LEO.

Moreover, the principle of the surveillance does not provide for the tracking of the objects. Therefore, during the observation of the LEO, long integration times do not improve the detectability of an object, assessed in relation to the signal-to-noise ratio in each illuminated pixel. Because, in the case of classical integration (the second one), the object crosses several pixels of the sensor (CCD or CMOS) over the integration time, penalizing not only the determination of the position and its dating, and integrating noise and therefore degrading the signal-to-noise ratio once the pixel has been crossed.

From another point of view, the known solutions are not adapted to the detection conditions in LEO, and therefore do not ensure the observation of all the observable objects with an adapted revisit time.

Finally, wide-field telescopes remain limited, such as in particular the telescopes known from document US 2009/009897 or document EP 1 772 761.

Other examples of telescopes are given in documents U.S. Pat. No. 7,045,774, US 2007/0188610 and US 2009/0015914.

Space surveillance systems for the survey of the near-Earth space are also known from documents EP 2 593 366, EP 2 593 367, and EP 2 593 368.

DISCLOSURE OF THE INVENTION

The main aim of the present invention is therefore to provide a passive optical device for monitoring objects in space orbit around the Earth in near-Earth, medium-Earth and geostationary Earth orbits, with a wide survey field with a capacity of at least 120° of azimuthal aperture.

According to one object of the invention, there is proposed a device for monitoring objects in space orbit around the Earth, the device comprising a chassis, a plate, at least three optical survey modules, and a power supply and control block housed at least partially inside the chassis, the plate being mounted on the chassis, and each optical survey module being mounted on the plate and including a rotating turret, an image sensor mounted on the rotating turret, and a passive optical system mounted on the inlet of the image sensor, the rotating turret being configured to pivot over more than 360° about a first axis perpendicular to the plane in which the plate extends and to pivot over 90° about a second axis perpendicular to the first axis and parallel to the plane in which the plate extends.

The device according to the invention thus forms a device with a passive optical system for the survey of space objects, said at least three optical modules providing a large simultaneous survey optical field making it possible to reduce the time required to detect objects in space orbit around the Earth, and thus to increase the number of objects that can be detected in a given time.

In a first embodiment of the device, the rotating turrets can be motorized turrets comprising at least one motor for actuating the rotation along the two axes of rotation, and the power supply and control block includes a control unit for each rotating turret configured to control a rotating turret independently of the other rotating turrets.

The optical modules can thus be controlled by an automated and/or remote control, and they can be controlled independently of each other, which possibly makes it possible to track an object being detected by an optical module while the other optical modules do not move or move in different directions.

According to a second embodiment of the device, the chassis can comprise height-adjustable feet, the feet being adjustable between at least two different lengths to have a plate that can be positioned between a first height of 1,000 mm and a second height of 2,030 mm.

The adjustable feet make it possible to adjust the height of the plate according to the environment in which the device is installed while maintaining reasonable dimensions and weight and to place the optical devices in the best conditions to have the clearest possible field of observation.

According to a third embodiment of the device, the plate can comprise a central orifice through which the power and data cables pass, coupled between the optical survey modules and the power supply and the control block.

The central orifice of the plate makes it possible to concentrate all the cables coupled to the different optical modules at the center of the device to direct them towards the power supply and control block and thus reduce the bulk of the device and reduce the risks that the cables enter the field of observation of one of the optical modules.

According to a fourth embodiment of the device, the rotating turrets are preferably made of aluminum to reduce the weight of the rotating turrets and thus the total weight of the device. As a variant, the rotating turrets can also be made of stainless steel to reduce the manufacturing cost.

According to a fifth embodiment of the device, the rotating turrets are preferably uniformly distributed on a circle with a diameter smaller than the inscribed circle of the plate.

The uniform distribution of the optical modules along the perimeter of a circle makes it possible to optimize the field of observation and to reduce the overlapping surface of the observation fields of the different optical modules.

According to a sixth embodiment of the device, the device can further comprise a temperature regulation block fixed on the power supply and control block and configured to regulate the temperature of the power supply and control block between +13° C. and +23° C. The power supply and control block can be made in the form of a power supply bay including a control unit.

The temperature regulation block allows the device to be placed and used in environments where conditions are normally less favorable to the proper operation of the device. The temperature control block can be a heating block or a cooling block or an air conditioning unit configured to heat or cool the power supply and control block depending on the environmental conditions.

According to a seventh embodiment of the device, the device can further comprise a hygrometric regulation block fixed on the power supply and control block configured to regulate the hygrometry inside the power supply and control block at a humidity level comprised between 30% and 60%.

The hygrometric regulation block allows the device to be placed and used in environments whose conditions are normally less favorable to the proper operation of the device.

In one embodiment, the temperature regulation block can be a heating block and the hygrometric regulation block can be an air conditioning block configured to cool the power supply bay and regulate its humidity.

According to an eighth embodiment of the device, the device preferably comprises six optical survey modules uniformly distributed on a circle whose diameter is smaller than the diameter of the inscribed circle of said plate.

The use of six optical modules makes it possible to have optimized optical coverage.

According to a ninth embodiment, the rotating turrets can be limited in minimum rotation about the first axis to 10° of amplitude, able to reach a maximum rotation of 360° and have a displacement pitch of 1° and able to reach a pitch of up to 0.1°.

BRIEF DESCRIPTION OF THE DRAWINGS

Other characteristics and advantages of the present invention will emerge from the description given below, with reference to the appended drawings which illustrate one exemplary embodiment thereof without any limitation.

FIG. 1 represents a perspective view of a device for monitoring objects in space orbit around the Earth according to one embodiment of the invention.

FIG. 2 represents a top view of the device of FIG. 1.

FIG. 3 represents a perspective view of the chassis and of the plate of the device of FIG. 1.

DESCRIPTION OF THE EMBODIMENTS

FIG. 1 schematically represents a perspective view of a device 1 for monitoring objects in space orbit around the Earth according to one embodiment of the invention.

The device 1 comprises a chassis 2, a plate 3, six optical survey modules 4, a power supply and control block 5, and an operating regulation block 6.

As illustrated in FIG. 3 which represents a perspective view of the chassis 2 and of the plate 3 of the device 1 of FIG. 1, the chassis 2 comprises a U-shaped base 200 including three segments 202 and four assemblies 204 each bolted to one end or corner of the base 200 and intended to fix the base 200 to the ground on which the device 1 will be fixed.

The chassis 2 further comprises four feet 206 each screwed, at a first end 2060, onto the base 200. The four feet 206 with anti-vibration devices are disposed at the four corners of a square extending in a plane parallel to the plane in which the base 200 extends. Two first feet 206 are secured to each other by a first crosspiece 208, and two second feet 206 distinct from the first feet are secured to each other by a second crosspiece 210.

Each foot 206 comprises a lower part 206a and an upper part 206b partially fitting onto the lower part 206a. The first crosspiece 208 is fixed on the lower parts 206a of the first two feet 206, and the second crosspiece 210 is fixed on the lower parts 206a of the second two feet 206.

The upper part 206b of each foot 206 slides along the lower part 206a with which it is associated, the lower part 206a sliding inside the upper part 206b. The height of each foot 206 can thus be adjusted between a low position and a high position depending on the environment of the device 1 to ensure that the field of vision of the optical modules is clear.

Each leg 206 comprises a second end 2065 fixed to the plate 3. The first end 2060 of each leg 206 corresponds to one end of the lower part 206a never covered by the upper part 206b, and the second end 2065 of each leg 206 corresponds to one end of the upper part 206b.

As illustrated in FIG. 2 which shows a top view of the device 1 of FIG. 1, the plate 3 has a disk shape and comprises a lower surface 300 facing the chassis 2 on which the plate 3 is fixed and an upper surface 302 opposite to the lower surface 300, the optical modules 4 being mounted on the upper surface 302 of the plate 3.

The plate 3 further comprises a central orifice 304 crossing the center of the disk on which a cover 306 with a hexagonal base is mounted, with an upper face 308 parallel to the upper surface 302 of the plate 3 and six lateral faces 310 extending perpendicular to the plate 3 between the upper surface 302 of the plate 3 and the upper face 308 of the cover 306. Each lateral face 310 of the cover 306 is pierced with an orifice 312 to be able to pass cables through an orifice 312 of the lateral face and the central orifice 304 of the plate 3.

The optical modules 4 are evenly disposed on the perimeter of a circle whose diameter is smaller than the external perimeter of the disk formed by the plate 3.

Thus, each optical module 4 is separated from the next optical module 4 by an angle of 30° measured relative to the center of the disk of the plate 3. This separation angle between modules may vary depending on the configurations.

If the plate had a shape other than that of a disk, a polygonal shape for example, the circle on which the optical modules 4 would be disposed would have a diameter smaller than the diameter of the circle inscribed in the polygonal shape of the plate 3.

Each optical module 4 comprises a motorized rotating turret 400 made of aluminum to maintain the lightest possible weight at a reduced cost. Each turret 400 comprises a support 402 fixed on the plate 3, the support 402 then being surmounted by a foot 404 which can pivot about a first axis perpendicular to the plane in which the plate 3 extends, the plate 3 extending parallel to a plane comprising the directions X and Y, and the first axis extending along a direction parallel to a direction Z as illustrated in FIG. 1.

The turret 400 of each optical module 4 also comprises an arm 406 coupled to the foot 404 of the turret 400. The arm 406 is rotatably mounted on the foot 404 about a second axis which is perpendicular to the first axis and which extends parallel to the plane comprising the directions X and Y.

An image sensor 408 coupled, on its optical inlet, to a passive optical system 410 such as an assembly of lenses is mounted on the arm 406 of each turret 400.

Thus, each assembly composed of an image sensor 408 and its associated passive optical system 410 can be oriented along two directions, the first direction and the second direction.

The foot 404 of a turret 400 can pivot about the first axis, i.e. Z axis, 185° in one direction and 185° in the other direction, thus covering 370° in a plane parallel to the XY plane. The arm 406 of a turret 400 can pivot about the second axis 90° in one direction and 90° in the other direction, thus covering 180° in a plane perpendicular to the XY plane.

The cables connecting the optical modules 4 to the power supply and control block 5 are not represented for clarity. Each cable passes through an orifice 312 of a lateral face 310 of the cover 306 before passing through the central orifice 304 of the plate 3 to then be routed to the power supply and control block 5. The power supply and control block 5 can thus control the electrical supply of the motors of the turrets 400 and the image sensors 408 of the optical modules, the orientation of the feet 404 and of the arms 406 of each turret, and the acquisition of the images by the image sensors 408.

The power supply and control block 5 is shaped to be disposed inside the volume defined by the chassis 2 and the plate 3, in particular between the feet 206 of the chassis 2. The power supply and control block 5 further comprises a control module for each turret 400 thus making it possible to control each turret 400 independently of the other turrets 400.

The operating regulation block 6 is thermodynamically coupled to the power supply and control block 5 and is configured to regulate the temperature and hygrometry inside the power supply and control block 5. The temperature in the latter block 5 can thus be maintained at a temperature comprised between +13° C. and +23° C. and at a hygrometry of less than 60% humidity for optimal operation of the device 1.

The invention claimed is:

1. A device for monitoring objects in space orbit around the Earth, the device comprising a chassis, a plate, at least three optical survey modules, and a power supply and control block housed at least partially inside the chassis, the plate being mounted on the chassis, and each optical survey module being mounted on the plate and including a rotating turret, an image sensor mounted on the rotating turret, and a passive optical system mounted on the inlet of the image sensor, the rotating turret being configured to pivot over more than 360° about a first axis perpendicular to the plane in which the plate extends and to pivot over 90° about a second axis perpendicular to the first axis and parallel to the plane in which the plate extends.

2. The device according to claim 1, wherein the rotating turrets are motorized turrets comprising at least one motor for actuating the rotation along the two axes of rotation, and the power supply and control block includes a control unit for each rotating turret configured to control a rotating turret independently of the other rotating turrets.

3. The device according to claim 1, wherein the chassis comprises height-adjustable feet, the feet being adjustable between at least two different lengths to have a plate that can be positioned between a first height of 1,000 mm and a second height of 2,030 mm.

4. The device according to claim 1, wherein the plate comprises a central orifice through which the power and data cables pass, coupled between the optical survey modules and the power supply and the control block.

5. The device according to claim 1, wherein the rotating turrets are made of aluminum.

6. The device according to claim 1, wherein the rotating turrets are uniformly distributed on a circle with a diameter smaller than the inscribed circle of the plate.

7. The device according to claim 1, further comprising a temperature regulation block fixed on the power supply and control block and configured to regulate the temperature of the power supply and control block between +13° C. and +23° C.

8. The device according to claim 1, further comprising a hygrometric regulation block fixed on the power supply and control block configured to regulate the hygrometry inside the power supply and control block at a humidity level comprised between 30% and 60%.

9. The device according to claim 1, comprising six optical survey modules uniformly distributed on a circle whose diameter is smaller than the diameter of the inscribed circle of said plate (3).

10. The device according to claim 1, wherein the rotating turrets are limited in rotation about the first axis to 10° of amplitude and have a displacement pitch of 1°.

* * * * *